Dec. 26, 1939. A. MELLOR ET AL 2,184,559
TREATMENT OF TEXTILE AND OTHER MATERIALS
Filed Feb. 4, 1937
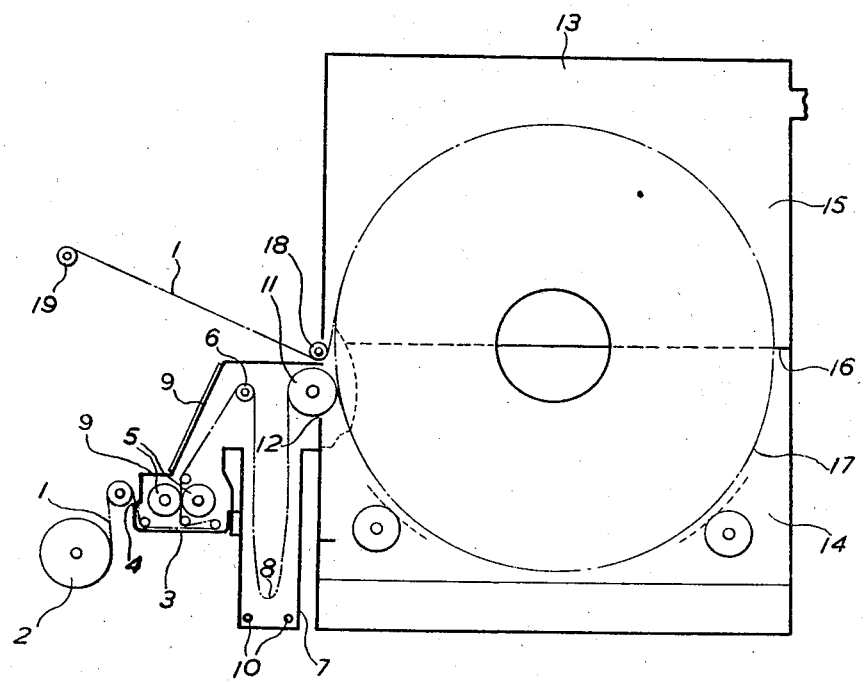
Inventors
A. Mellor
G. Bingham
W. Pool Patented Dec. 26, 1939

2,184,559

UNITED STATES PATENT OFFICE 2,184,559

TREATMENT OF TEXTILE AND OTHER MATERIALS

Albert Mellor, George Bingham, and William Pool, Spondon, near Derby, England, assignors to Celanese Corporation of America, a corporation of Delaware Application February 4, 1937, Serial No. 124,138
In Great Britain February 6, 1936

9 Claims. (Cl. 8—145)

This invention relates to the incorporation of coloring matters and other substances in textile and other materials, and is especially concerned with the coloration of textile materials consisting of or comprising filaments of cellulose acetate or other cellulose esters or ethers.

In the coloring of textile materials, especially textile materials of cellulose acetate or other cellulose esters or ethers, organic liquids offer certain advantages over water as the medium in which to apply dyestuffs or dyestuff components. Generally speaking volatile organic liquids wet and penetrate textile materials much more readily than aqueous liquids. Further, the greater number of the available dyestuffs for cellulose acetate or other cellulose esters or ethers are insoluble in water but soluble in organic solvents. When using aqueous dyebaths, therefore, the dyestuff must be present therein in dispersed form instead of the true solution, as is possible when utilising organic solvents instead of water. Cellulose acetate is dyed more slowly by these aqueous dispersions than by solutions of dyestuffs in organic solvents. Further, volatile organic liquids are much more readily removed from fabrics and with less expenditure of heat than is the case with water.

It is therefore possible to color a cellulose acetate fabric very quickly by impregnating it with a solution of a dyestuff in a volatile organic solvent and thereafter drying the material. The solution of the dyestuff wets, penetrates and colors the material very rapidly and the solvent is easily and quickly removed when the coloring process is complete. The present invention is concerned with improvements in processes of this type.

We have found that very satisfactory colorations on cellulose acetate and other cellulose-ester, or cellulose-ether, textile materials may be produced by impregnating the material with a solution of a dyestuff in a volatile organic solvent, and thereafter subjecting the impregnated material to the action of vapors of an organic solvent. Preferably the vapor treatment is such that the fabric is maintained moist with organic solvent during at least a part of the treatment. After the vapor treatment the material is dried.

The colorations produced by this process are excellent as regards uniformity and fastness to rubbing, and in these respects are superior to those obtained by impregnating the material with the solution of the dyestuff and drying without a vapor treatment. Moreover the impregnation of the material with the solution of the dye in the volatile organic liquid and the vapor treatment lend themselves to continuous operation. Drying may likewise be effected as a continuous operation. The whole series of operations constituting the dyeing process may therefore be carried out in a continuous manner, the material being passed first through a suitable device for impregnating it with the dye solution, thence through vapor of an organic liquid, and finally through a suitable continuous dryer. Such a continuous process is not practicable where prolonged immersion of the material in a dyebath is necessary to effect the coloration.

As indicated above, it is particularly advantageous to arrange that the material is maintained moist with organic solvent during at least a part of the vapor treatment. To this end the material impregnated with the solution of the dyestuff in the volatile organic solvent may be passed through substantially saturated vapors of the said volatile organic solvent, for example through air substantially saturated with the vapor of the solvent or through vapor alone, the said vapor being at such pressure and temperature as to be substantially in equilibrium with liquid solvent. Thus the material impregnated with the dye solution may be passed through a substantially closed chamber containing air. The latter rapidly becomes saturated with vapor of the organic solvent by evaporation of a portion of the latter from the material. If desired, vapors of the organic solvent may be introduced into the chamber from an external source, or liquid may be introduced, separately from that carried by the fabric, and vaporised in the chamber. The chamber may be at ordinary temperatures, or if desired at higher temperatures. Such higher temperatures may be secured by steam pipes or other heating means suitably disposed.

As regards the duration of the vapor treatment, this may be of the order of from 5-60 seconds, e. g., from 30 seconds to 2 minutes.

The impregnation of the textile material with the solution of the dyestuff in the organic liquid may be effected in any convenient manner, for example by spraying, padding, or other method of mechanical impregnation. The impregnation is conveniently conducted so that the material leaving the impregnation device carries about 75 to 150% of its weight of the liquid. The concentration of the dye in the liquid should therefore be such that the desired shade is obtained when the material carries a weight of liquid within these limits. For the production of light to medium shades concentrations of the order of 0.05 to 0.5% can be employed, and for the production of medium to deep shades concentrations of 0.15 to 1.5%.

The impregnation is most conveniently effected by means of a padding mangle, and particularly by means of a padding mangle of the type described in United States application S. No. 123,102 filed January 30, 1937, corresponding to British application No. 3629/36 filed February 6, 1936. As explained in that specification, this type of padding mangle enables extremely uniform impregnation of the material with the liquid to be obtained, and avoids troubles due to liquid expressed from the material being carried again on to the material; it further avoids marking of the material by solid dye or concentrated dye solution produced by evaporation of dye solution on the rolls and carried by the rolls on to the impregnated fabric leaving the mangle.

The impregnated and vapor-treated material may subsequently be dried in any convenient manner. Where the impregnation and vapor treatment are effected in a continuous manner, it will of course be convenient to carry out drying likewise in a continuous manner, for example by passing the material through a chamber through which warm air or other gas is being drawn. A particularly useful method, however, is to effect at least the first part of the drying by means of superheated vapors of the organic liquid employed. The material may be passed through a chamber in which it meets superheated vapors of the liquid. The superheat is utilized to evaporate solvent from the fabric. The cooled vapors are continuously withdrawn from the chamber, a part being then superheated and returned to the chamber while the remainder are condensed to liquid for further use in the process. The drying may be accomplished with great advantage in the apparatus described in United States application S. No. 124,139 filed February 4, 1937 corresponding to British application No. 3630/36 filed February 6, 1936. In this apparatus drying is effected as the fabric is carried round on the surface of a perforated drum. During one part of the travel of the fabric removal of solvent is effected by means of superheated vapors of the solvent as described above, while during the remainder of its travel the drying of the fabric is completed by means of air. Recovery of solvent from the air used may be effected for instance by absorption in activated carbon.

The volatile organic solvent most suitable in any particular case depends upon the nature of the textile material to be dyed and the nature of the dyestuff to be used. It must, of course, be a sufficiently good solvent for the dye and at the same time it should have some swelling action on the material to be colored, at least at the temperature at which the vapor treatment is effected.

Dichlorethylene has been found a particularly useful volatile organic solvent for the coloration of cellulose acetate materials in that it is a swelling agent for cellulose acetate and is a good solvent for many of the water-insoluble coloring matters which are useful for the coloration of cellulose acetate materials. It is an extremely good solvent for many unsulphonated nitroamino-mono-azo-dyestuffs, for example the azo dyes para-nitro-ortho-anisidine→dimethyl- or diethyl-aniline, dinitro-aniline→diethyl-aniline, and para-nitraniline→cresidine.

Other organic liquids or liquid mixtures may be utilized. Liquids which have no substantial swelling action on cellulose acetate may be mixed with liquids which have a swelling action in order to obtain solvent mixtures having the required swelling action on the material to be colored. For instance, carbon tetrachloride may be used in admixture with a small amount of absolute ethyl alcohol, or ethylene dichloride in admixture with carbon tetrachloride in the proportion of about 4 parts of the former to 1 part of the latter.

We have further found that the treatment with vapors of a volatile organic liquid is not only of use in the case of materials impregnated with solutions of dyestuffs in volatile organic liquids, but also in the case of materials upon which dyestuffs have been deposited by other means. For example a dyeing produced by ordinary dyeing methods but which rubs badly, may be treated with saturated vapors of dichlorethylene or other volatile organic liquid which has a swelling action on the material, in order to fix the loosely adherent dyestuff. Again, a cellulose acetate material may be padded with an aqueous dispersion of a water-insoluble dyestuff, dried, and the dyestuff fixed on the material by treatment with saturated vapors of dichlorethylene or other suitable organic liquid.

The invention is of especial value in connection with the coloration of cellulose acetate textile materials. The new process may be used, however, in the coloration of textile materials of other cellulose esters or ethers, for example of cellulose formate, propionate or butyrate, or other organic acid esters of cellulose, or of methyl, ethyl, or benzyl cellulose or other ethers of cellulose. If desired the new process may be employed for the topping of cellulose ester or ether textile materials containing pigments, e. g., carbon black, magnetic oxide of iron, or other dark colored pigment, especially when the nature and proportion of pigment are such as to impart a grey or like neutral shade to the material prior to coloring. Again the new process may be employed when coloring other textile materials, e. g., cotton, wool, silk, or regenerated cellulose artificial silk, especially when using dyes which are soluble in organic liquids.

Further, the new process is not only of use for the incorporation of dyestuffs in textile materials. If desired dyestuff components, e. g. diazotisable amines or azo coupling components or other substances capable of being converted into dyestuffs on the material may be incorporated by the new process. Again the process may be utilised for the incorporation of other substances, e. g., substances capable of increasing the fastness of dyeings on textiles. Examples of such substances are the aralkylamines and other amino bases mentioned in United States Patent No. 2,017,119, the aralkylated aromatic amines mentioned in United States Patent No. 2,008,902 and British Patent No. 361,381, and the basic acidylamino compounds mentioned in United States application S. No. 677,848 filed June 27, 1933 now Patent Number 2,094,809, patented Oct. 5, 1937.

The invention is not limited to processes in which the materials are colored, or otherwise treated, uniformly. It can be used, for instance, when producing colored pattern effects, e. g., by the resist method. For example, a mechanical or chemical resist, e. g., a sodium formaldehyde sulphoxylate preparation can be applied locally to cellulose-acetate or other materials by printing or other means and the materials then impregnated with dye solution and treated with vapors of an organic liquid. Again, materials may be printed with coloring matters and the latter fixed by treatment with the vapors.

The new process is further applicable not only to the treatment of materials of a filamentary nature but also to other materials having one dimension small compared with another. Thus, films, foils, ribbons and straws can be treated according to the invention. For instance, in the coloration of cellulose-acetate films according to the invention, the films may be first passed through a solution of a dyestuff in dichlorethylene at 20° C. then through saturated dichlorethylene vapors, passed between squeezing rollers to remove any surface liquid, and then dried. The films can thus be colored in deep shades fast to rubbing.

The invention also includes apparatus suitable for the treatment of lengths of sheet material according to the invention, said apparatus comprising means for impregnating the material with liquid, a substantially closed chamber arranged for the passage of the impregnated material therethrough, drying apparatus associated with the substantially closed chamber, and feeding means arranged to pass the material successively through the impregnating means, substantially closed chamber and drying apparatus.

One form of apparatus according to the invention is illustrated in the accompanying drawing, which represents diagrammatically a side elevation of the apparatus.

Material 1 is unwound from supply roll 2, enters the padding mangle 3 (described in greater detail in United States application S. No. 123,102 filed January 30, 1937, corresponding to British application No. 3629/36 filed February 6, 1936), by a narrow slot 4, emerges between squeezing rollers 5 and passes over roller 6 into the vapor tank 7, where it forms a running loop 8. The vapor tank 7 forms with the casing 9 above the padding mangle 3 a substantially closed chamber for the vapor treatment of the padded material. This chamber can be heated by steam pipes 10 disposed at the bottom of the tank 7. From the tank 7 the vapor-treated material passes over a roller 11 arranged in a slot 12 in the casing of the drying apparatus 13. This apparatus, as described in detail in United States application S. No. 124,139, corresponding to British application No. 3630/36 filed February 6, 1936, contains two compartments 14 and 15, separated by partition 16. The material is carried by the perforated drum 17 first through compartment 14, where it encounters superheated solvent vapor, and then through compartment 15 where drying of the material on the drum is completed by means of air. The dried material emerges from the drying apparatus by way of the roller 18 and is then wound on the take-up roller 19.

The invention is illustrated by the following detailed examples, which are not, however, to be regarded as limiting the invention in any way.

*Example 1*

A padding mangle of the type described in detail in United States application S. No. 123,102 filed January 30, 1937, corresponding to British application No. 3629/36 filed February 6, 1936, and as illustrated diagrammatically at 3 in the accompanying drawing, is charged with a dichlorethylene solution containing 0.075% of 1-(β-oxyethylamino)-anthraquinone and 0.019% of 2:4-dinitro-4'-amino-diphenylamine. Scoured cellulose-acetate satin fabric is given a 3 foot run through this solution at a speed of 60 feet per minute, emerging from the squeezing rollers, adjusted for even expression, carrying 75% of its weight of dye solution. The fabric carrying the dye liquor then passes through the vapor tank 7 over a run of 10 feet, being thus exposed to saturated dichlorethylene vapors for a period of 10 seconds. The vapor-treated fabric then passes to the dryer 13, described in detail in United States application S. No. 124,139 filed February 4, 1937, corresponding to British application No. 3630/36 filed February 6, 1936, where it is treated, while on the perforated drum 17, first over a run of 15 feet with superheated dichlorethylene vapors in the section 14 and then over a further run of 15 feet with heated air in the section 15. The fabric is thus evenly dyed a level light orange shade fast to rubbing.

*Example 2*

Using the same apparatus as in the previous example, the padding mangle is charged with a dichlorethylene solution containing 0.56% of 2:4-dinitro-4'-amino-diphenylamine, 0.15% of 1-amino-4-hydroxy-anthraquinone, and 0.26% of 1-amino-4-phenylamino-anthraquinone. Scoured cellulose-acetate fabric is then passed through the apparatus at the rate of 15 feet per minute, emerging from the mangle carrying 120% of its weight of dye solution. The vapor-treated and dried material is thus colored a level deep brown shade fast to rubbing.

In the appended claims the term "organic derivative of cellulose" is to be read as denoting an ether of cellulose or an ester of cellulose with an organic acid.

Having described our invention what we desire to secure by Letters Patent is:

1. Process for the fixation of coloring matter on cellulose acetate materials, which comprises subjecting the material carrying the coloring matter to the action of substantially saturated vapors of an organic liquid comprising dichlorethylene.

2. Process for the coloration of cellulose acetate textile materials, which comprises impregnating the material with a solution of a water-insoluble dyestuff in a volatile organic liquid comprising dichlorethylene and fixing the dyestuff by subjecting the impregnated material to the action of substantially saturated vapors of an organic liquid comprising dichlorethylene.

3. Process for the fixation, on materials having one dimension small in relation to another and having a basis of an organic derivative of cellulose, of an organic coloring matter having direct affinity for the material, which comprises subjecting the material carrying the coloring matter to the action of the saturated vapor of an organic liquid which is chemically inert towards the coloring matter.

4. Process for the fixation, on textile materials having a basis of an organic derivative of cellulose, of an organic coloring matter having direct affinity for the material and which has been applied to the material from solution in an organic solvent, which comprises subjecting the material carrying the coloring matter to the action of the saturated vapor of an organic liquid which is chemically inert towards the coloring matter.

5. Process for the fixation, on textile materials having a basis of an organic derivative of cellulose, of an organic coloring matter having direct affinity for the material and which has been applied to the material from solution in an organic solvent, which comprises subjecting the material carrying the coloring matter to the action of the saturated vapor of the same organic solvent as was used in the application of the coloring matter to the material.

6. Process for coloring textile materials having a basis of cellulose acetate, which comprises impregnating the materials with a solution in an organic solvent of a coloring matter having direct affinity for the materials, and thereafter subjecting the materials carrying the coloring matter to the saturated vapors of the said organic solvent.

7. Process for coloring textile materials having a basis of cellulose acetate, which comprises impregnating the materials with a solution in an organic solvent of a coloring matter having direct affinity for the materials and continuously with the impregnation first passing the materials through the saturated vapors of the said organic solvent and then drying the materials.

8. Process for coloring textile materials having a basis of cellulose acetate, which comprises impregnating the materials with a solution of an organic solvent and a water-insoluble coloring matter having direct affinity for the materials and continuously with the impregnation first passing the materials through the saturated vapors of the said organic solvent and then drying the materials.

9. Process for the fixation, on films having a basis of an organic derivative of cellulose, of an organic coloring matter having direct affinity for the film and which has been applied to the film from solution in an organic solvent, which comprises subjecting the film carrying the coloring matter to the action of the saturated vapor of an organic liquid which is chemically inert towards the coloring matter.

ALBERT MELLOR.
GEORGE BINGHAM.
WILLIAM POOL.